US008954754B2

(12) United States Patent
Yap et al.

(10) Patent No.: US 8,954,754 B2
(45) Date of Patent: Feb. 10, 2015

(54) METHOD AND APPARATUS TO PROCESS SHA-1 SECURE HASHING ALGORITHM

(75) Inventors: Kirk S. Yap, Framingham, MA (US); Gilbert M. Wolrich, Framingham, MA (US); James D. Guilford, Northborough, MA (US); Vinodh Gopal, Westborough, MA (US); Erdinc Ozturk, Marlborough, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,293

(22) PCT Filed: Dec. 22, 2011

(86) PCT No.: PCT/US2011/066813
§ 371 (c)(1),
(2), (4) Date: Jun. 26, 2013

(87) PCT Pub. No.: WO2013/095503
PCT Pub. Date: Jun. 27, 2013

(65) Prior Publication Data
US 2013/0283064 A1    Oct. 24, 2013

(51) Int. Cl.
*H04L 9/00* (2006.01)
*G06F 21/60* (2013.01)
*H04L 9/32* (2006.01)
(52) U.S. Cl.
CPC ............ *G06F 21/602* (2013.01); *H04L 9/3239* (2013.01); *H04L 2209/122* (2013.01)
USPC ...................................................... 713/190

(58) Field of Classification Search
CPC combination set(s) only.
See application file for complete search history.

(56) References Cited

U.S. PATENT DOCUMENTS

| 7,882,358 B2* | 2/2011 | Hughes et al. ................ 713/176 |
| 8,788,766 B2* | 7/2014 | Rose et al. ..................... 711/156 |
| 8,838,997 B2* | 9/2014 | Wolrich et al. ............... 713/189 |
| 2002/0066014 A1 | 5/2002 | Dworkin et al. |
| 2003/0002666 A1 | 1/2003 | Takahashi |
| 2004/0260740 A1 | 12/2004 | Liu |
| 2005/0144204 A1 | 6/2005 | Lee et al. |
| 2012/0328097 A1* | 12/2012 | Sheikh et al. ................... 380/44 |
| 2014/0093069 A1* | 4/2014 | Wolrich et al. ................. 380/28 |
| 2014/0095891 A1* | 4/2014 | Wolrich et al. ............... 713/190 |
| 2014/0195782 A1* | 7/2014 | Yap et al. ...................... 712/208 |

OTHER PUBLICATIONS

International Search Report mailed Aug. 31, 2012, for International Application No. PCT/US2011/066813, 10 pages.
U.S. Department of Commerce, "Secure Hash Standard" Computer Systems Laboratory, National Institute of Standards and Technology, Gaithersburg, MD, FIPS PUB 180-1, Apr. 17, 1995.
U.S. Department of Commerce, "Secure Hash Standard (SHS)" Information Technology Laboratory, National Institute of Standards and Technology, Gaithersburg, MD, FIPS PUB 180-3, Oct. 2008.

* cited by examiner

*Primary Examiner* — Beemnet Dada
(74) *Attorney, Agent, or Firm* — Blakely, Sokoloff, Taylor & Zafman LLP

(57) ABSTRACT

A processor includes an instruction decoder to receive a first instruction to process a SHA-1 hash algorithm, the first instruction having a first operand to store a SHA-1 state, a second operand to store a plurality of messages, and a third operand to specify a hash function, and an execution unit coupled to the instruction decoder to perform a plurality of rounds of the SHA-1 hash algorithm on the SHA-1 state specified in the first operand and the plurality of messages specified in the second operand, using the hash function specified in the third operand.

20 Claims, 11 Drawing Sheets

One iteration within the SHA-1 compression function:
A, B, C, D and E are 32-bit words of the state;
F is a nonlinear function that varies;
⬅ₙ denotes a left bit rotation by n places;
n varies for each operation;
$W_t$ is the expanded message word of round t;
$K_t$ is the round constant of round t;
⊞ denotes addition modulo $2^{32}$.

$F_t(B,C,D) = (B \text{ AND } C) \text{ OR } ((\text{NOT } B) \text{ AND } D)$  $(0 <= t <= 19)$ $F_t(B,C,D) = B \text{ XOR } C \text{ XOR } D$  $(20 <= t <= 39)$ $F_t(B,C,D) = (B \text{ AND } C) \text{ OR } (B \text{ AND } D) \text{ OR } (C \text{ AND } D)$  $(40 <= t <= 59)$ $F_t(B,C,D) = B \text{ XOR } C \text{ XOR } D$  $(60 <= t <= 79)$.

FIG. 2A (Prior Art)

$K_t = \text{0x5A827999}$  $(0 <= t <= 19)$ $K_t = \text{0x6ED9EBA1}$  $(20 <= t <= 39)$ $K_t = \text{0x8F1BBCDC}$  $(40 <= t <= 59)$ $K_t = \text{0xCA62C1D6}$  $(60 <= t <= 79)$

FIG. 2B (Prior Art)

```
MOV        XMM0, (3, 2, 1, 0)
    VADD   XMM11, XMM0, MEMK3-0
    SHA1R4 XMM15, XMM11, f1-(3-0)
MOV        XMM1, (7, 6, 5, 4)
MOV  XMM2, (11, 10, 9, 8)
VADD  XMM12, XMM1, MEMK7-4
    SHA1R4 XMM15, XMM12, f1-(7-4)
MOV        XMM3, (15, 14, 13, 12)
MSG1SHA1   XMM0, XMM1, XMM2   (11|5|3, 10|4|2, 9|3|1, 8|2|0)
MSG2SHA1   XMM0, XMM3         (19, 18, 17, 16)
VADD  XMM13, XMM2, MEMK11-8
    SHA1R4 XMM15, XMM13, f1-(11-8)
MSG1SHA1   XMM1, XMM2, XMM3   (15|9|7, 14|8|6, 13|7|5, 12|6|4)
MSG2SHA1   XMM1, XMM0         (23, 22, 21, 20)
VADD  XMM14, XMM3, MEMK15-12
    SHA1R4 XMM15, XMM14, f1-(15-12)
MSG1SHA1   XMM2, XMM3, XMM0   (19|13|11, 18|12|10, 17|15|9, 16|14|8)
MSG2SHA1   XMM2, XMM1         (27, 26, 25, 24)
    VADD   XMM11, XMM0, MEMK19-16
SHA1R4 XMM15, XMM11, f1-(19-16)
MSG1SHA1   XMM3, XMM0, XMM1   (23|18|15, 22|20|14, 21|19|13, 20|18|12)
MSG2SHA1   XMM3, XMM2         (31, 30, 29, 28)
    VADD   XMM12, XMM1, MEMK23-20
 SHA1R4 XMM15, XMM12, f2-(23-20)

MSG1SHA1   XMM0, XMM1, XMM2   (27|21|19, 26|20|18, 25|19|17, 24|18|16)
MSG2SHA1   XMM0, XMM3         (35, 34, 33, 32)
     VADD  XMM13, XMM2, MEMK27-24
SHA1R4 XMM15, XMM13, f2-(27-24)

MSG1SHA1   XMM1, XMM2, XMM3   (31|25|23, 30|24|22, 29|23|21, 28|22|20)
MSG2SHA1   XMM1, XMM0         (39, 38, 37, 36)
     VADD  XMM14, XMM3, MEMK31-28
SHA1R4 XMM15, XMM14, f2-(31-28)
MSG1SHA1   XMM2, XMM3, XMM0   (35|29|27, 34|28|26, 33|27|25, 32|26|24)
MSG2SHA1   XMM2, XMM1         (43, 42, 41, 40)
     VADD  XMM11, XMM0, MEMK35-32
SHA1R4 XMM15, XMM11, f2-(35-32)
MSG1SHA1   XMM3, XMM0, XMM1         (39|33|31, 38|32|30, 37|31|29, 36|30|28)
MSG2SHA1   XMM3, XMM2         (47, 46, 45, 44)
     VADD  XMM12, XMM1, MEMK39-36
SHA1R4 XMM15, XMM12, f2-(39-36)
```

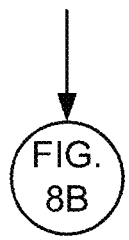

FIG. 8A

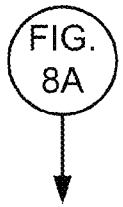

```
MSG1SHA1   XMM0, XMM1, XMM2      (43|37|35, 42|36|34, 41|35|33, 40|34|32)
MSG2SHA1   XMM0, XMM3            (51, 50, 49, 48)
    VADD   XMM13, XMM2, MEMK42-40
SHA1R4 XMM15, XMM13, f3-(43-40)
MSG1SHA1   XMM1, XMM2, XMM3      (45|41|39, 46|40|38, 45|39|37, 44|38|36)
MSG2SHA1   XMM1, XMM0            (55, 54, 53, 52)
    VADD   XMM14, XMM3, MEMK47-44
SHA1R4 XMM15, XMM14, f3-(47-44)
MSG1SHA1   XMM2, XMM3, XMM0      (51|45|43, 50|44|42, 49|43|41, 48|42|40)
MSG2SHA1   XMM2, XMM1            (59, 58, 57, 56)
    VADD   XMM11, XMM0, MEMK51-48
SHA1R4 XMM15, XMM11, f3-(51-48)
MSG1SHA1   XMM3, XMM0, XMM1      (55|49|47, 54|48|46, 53|47|45, 52|46|44)
MSG2SHA1   XMM3, XMM2            (63, 62, 61, 60)
    VADD   XMM12, XMM1, MEMK55-52
SHA1R4 XMM15, XMM12, f3-(55-52)
MSG1SHA1   XMM0, XMM1, XMM2      (59|55|51, 58|52|50, 57|51|49, 56|50|48)
MSG2SHA1   XMM0, XMM3            (67, 66, 65, 64)
    VADD   XMM13, XMM2, MEMK59-56
SHA1R4 XMM15, XMM13, f3-(59-56)
MSG1SHA1   XMM1, XMM2, XMM3      (63|57|55, 62|56|54, 61|55|53, 60|56|52)
MSG2SHA1   XMM1, XMM0            (71, 70, 69, 68)
    VADD   XMM14, XMM3, MEMK63-60
SHA1R4 XMM15, XMM14, f4-(63-60)
MSG1SHA1   XMM2, XMM3, XMM0      (67|61|59, 66|60|58, 65|59|57, 64|58|56)
MSG2SHA1   XMM2, XMM1            (75, 74, 73, 72)
    VADD   XMM11, XMM0, MEMK67-64
SHA1R4 XMM15, XMM11, f4-(67-64)
MSG1SHA1   XMM3, XMM0, XMM1      (71|65|63, 70|64|62, 69|63|61, 68|62|60)
MSG2SHA1   XMM3, XMM2            (79, 78, 77, 76)
    VADD   XMM12, XMM1, MEMK71-68
SHA1R4 XMM15, XMM12, f4-(71-68)
    VADD   XMM13, XMM2, MEMK75-72
SHA1R4 XMM15, XMM13, f4-(75-72)
    VADD   XMM14, XMM3, MEMK79-76
SHA1R4 XMM15, XMM14, f4-(79-76)
```

FIG. 8B

METHOD AND APPARATUS TO PROCESS SHA-1 SECURE HASHING ALGORITHM

CROSS-REFERENCE TO RELATED APPLICATION

This patent application is a U.S. National Phase Application under 35 U.S.C. §371 of International Application No. PCT/US2011/066813, filed Dec. 22, 2011, entitled METHOD AND APPARATUS TO PROCESS SHA-1 SECURE HASHING ALGORITHM.

FIELD OF THE INVENTION

Embodiments of the present invention relate generally to instruction processing apparatuses. More particularly, embodiments of the invention relate to instruction processing apparatus to process SHA-1 secure hashing algorithms.

BACKGROUND

SHA stands for Secure Hash Algorithm. It consists of five hash functions designed by the National Security Agency (NSA) and published by the National Institute of Standards and Technology (NIST). Amongst all, SHA-1 is most popular one. SHA-1 produces a 160-bit message digest for a message having a maximum length of $2^{64}$. A message digest is a fixed-length output of a message. The message digest is then input to a digital signature algorithm (DSA), which will then generate the signature for the message. Signing the message digest instead of the message offers improved performance because the message digest will be much smaller than the message. The recipient of the message will then use the same hash algorithm to verify the signature. Any change that occurs during transit will result in a different message digest and, thus, the signature will not verify. Once it is verified as true, the recipient is able to unlock the message. This method prevents unauthorized users from viewing messages that are not intended for them.

When computing a message digest, SHA-1 processes blocks of 512 bits. The total length of the message digest will be a multiple of 512. FIG. 1 is a block diagram illustrating a typical iteration of the SHA-1 operations. FIGS. 2A and 2B show functions and constants respectively used during rounds of SHA-1 operations. Processing a 512 bit/64 byte block of data with SHA-1 hash algorithm consists of performing 80 rounds (repetitions) of the round algorithm. For each round a message input of 32 bit is required, where the 512 bits of the block being hashed is used directly for the first 16 rounds of message data input, and the message inputs for rounds 17 to 80 are derived by combining previous message inputs according to a "message scheduling" function specified by the SHA-1 standard.

Specifically, according to the SHA-1 standard, a message digest is computed using padded message. The computation uses two buffers, each consisting of five 32-bit words, and a sequence of eighty 32-bit words. The words of the first 5-word buffer are labeled A, B, C, D, and E. The words of the second 5-word buffer are labeled $H_0, H_1, H_2, H_3$, and $H_4$. The words of the 80-word sequence are labeled $W_0, W_1, \ldots, W_{79}$. A single word buffer TEMP is also employed. To generate the message digest, the 16-word blocks $M_1, M_2, \ldots, M_n$ defined in the standard are processed in order. The processing of each $M_i$ involves 80 steps. Before processing any blocks, the $\{H_i\}$ are initialized as follows: $H_0$=0x67452301; $H_1$=0xEFCDAB89; $H_2$=0x98BADCFE; $H_3$=0x10325476; and $H_4$=0xC3D2E1F0.

$M_1, M_2, M_n$ are then processed. To process $M_i$, following operations are performed:
 a). Divide $M_i$ into 16 words $W_0, W_1, \ldots, W_{15}$, where $W_0$ is the left-most word.
 b). For t=16 to 79 let $W_t=S^1(W_{t-3}$ XOR $W_{t-8}$ XOR $W_{t-14}$ XOR $W_{t-16})$.
 c). Let A=$H_0$, B=$H_1$, C=$H_2$, D=$H_3$, E=$H_4$.
 d). For t=0 to 79 do
    TEMP=$S^5(A)+f_t(B,C,D)+E+W_t+K_t$;
    E=D; D=C; C=$S^{30}$(B); B=A; A=TEMP;
 e). Let $H_0=H_0+A$, $H_1=H_1+B$, $H_2=H_2+C$, $H_3=H_3+D$, $H_4=H_4+E$.

After processing $M_n$, the message digest is the 160-bit string represented by the 5 words $H_0, H_1, H_2, H_3$, and $H_4$.

Alternatively, according to the SHA-1 standard, the above assumes that the sequence $W_0, \ldots, W_{79}$ is implemented as an array of eighty 32-bit words. This is efficient from the standpoint of minimization of execution time, since the addresses of $W_{t-3}, \ldots, W_{t-16}$ in step (b) are easily computed. If space is at a premium, an alternative is to regard $\{W_t\}$ as a circular queue, which may be implemented using an array of sixteen 32-bit words W[0], ... W[15]. In this case, let MASK=0x0000000F, then processing of $M_i$ is as follows:
 a). Divide $M_i$ into 16 words W[0], ..., W[15], where W[0] is the left-most word.
 b). Let A=$H_0$, B=$H_1$, C=$H_2$, D=$H_3$, E=$H_4$.
 c). For t=0 to 79 do
    s=t^MASK;
    if (t>=16) W[s]=$S^1$(W[(s+13)^MASK] XOR W[(s+8) AND MASK] XOR W[(s+2)^MASK] XOR W[s]);
    TEMP=$S^5(A)+f_t(B,C,D)+E+W[s]+K_t$;
    E=D; D=C; C=$S^{30}$(B); B=A; A=TEMP;
 d). Let $H_0=H_0+A$, $H_1=H_1+B$, $H_2=H_2+C$, $H_3=H_3+D$, $H_4=H_4+E$.

Further detailed information concerning the SHA-1 specification can be found in Secure Hash Standard published by Federal Information Processing Standard Publication (FIPS PUB 180—1995 Apr. 17).

Conventional software solutions utilize standard 32-bit instructions and 32-bit register/memory storage. The round calculation requires four 32-bit additions, two 32-bit rotates, logic functions and moves. Each message input for rounds 17 to 80 requires rotate and 3 exclusive ORs (XORs). With four 32-bit additions, 3 rotates, and several logical functions for each of the 80 round/message passes, even with a multiple execution unit processor several cycles are required to process around. There has been a lack of efficient ways to perform the above operations.

BRIEF DESCRIPTION OF THE DRAWINGS

Embodiments of the invention are illustrated by way of example and not limitation in the figures of the accompanying drawings in which like references indicate similar elements.

FIGS. 2A and 2B are diagrams illustrating functions and constants used in SHA-1 standard algorithm.

FIGS. 8A and 8B are pseudocode representing a sequence of code received by a processor to perform SHA-1 algorithm according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a new instruction set architecture (ISA) is utilized to perform multiple SHA-1 operations described above in response to a single instruction to improve the efficiency of the SHA-1 computation. The performance may be optimized by reducing the time required to perform the SHA-1 round function while deriving the message inputs for rounds 17 to 80, such that the speed of executing the SHA-1 algorithm is mainly subject to the round calculation. In one embodiment, registers having at least 160 bits are utilized to store SHA-1 state variables (e.g., state variables A, B, C, D, and E) and multiple message inputs (e.g., four message inputs), such that multiple rounds (e.g., four rounds) of SHA-1 round hash operations can be performed in parallel by a processor such as a vector capable processor in response to a single instruction. In addition, registers having at least 128 bits are utilized to prepare multiple message inputs for the next cycle or iteration (e.g., next four rounds) based on previous message inputs.

Figure 1:
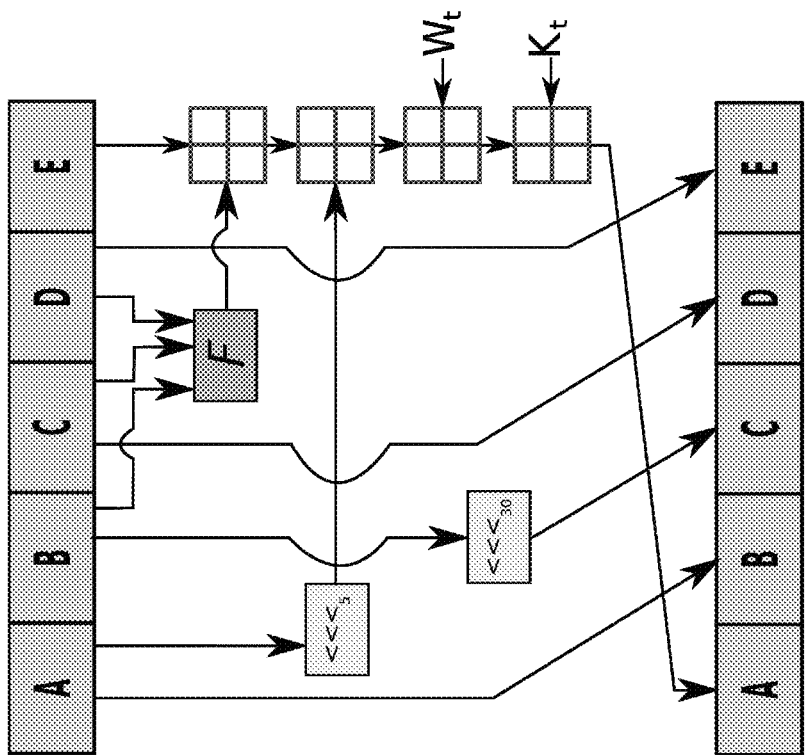
FIG. 1 is a block diagram illustrating a typical process of the SHA-1 standard algorithm.
Figure 3:
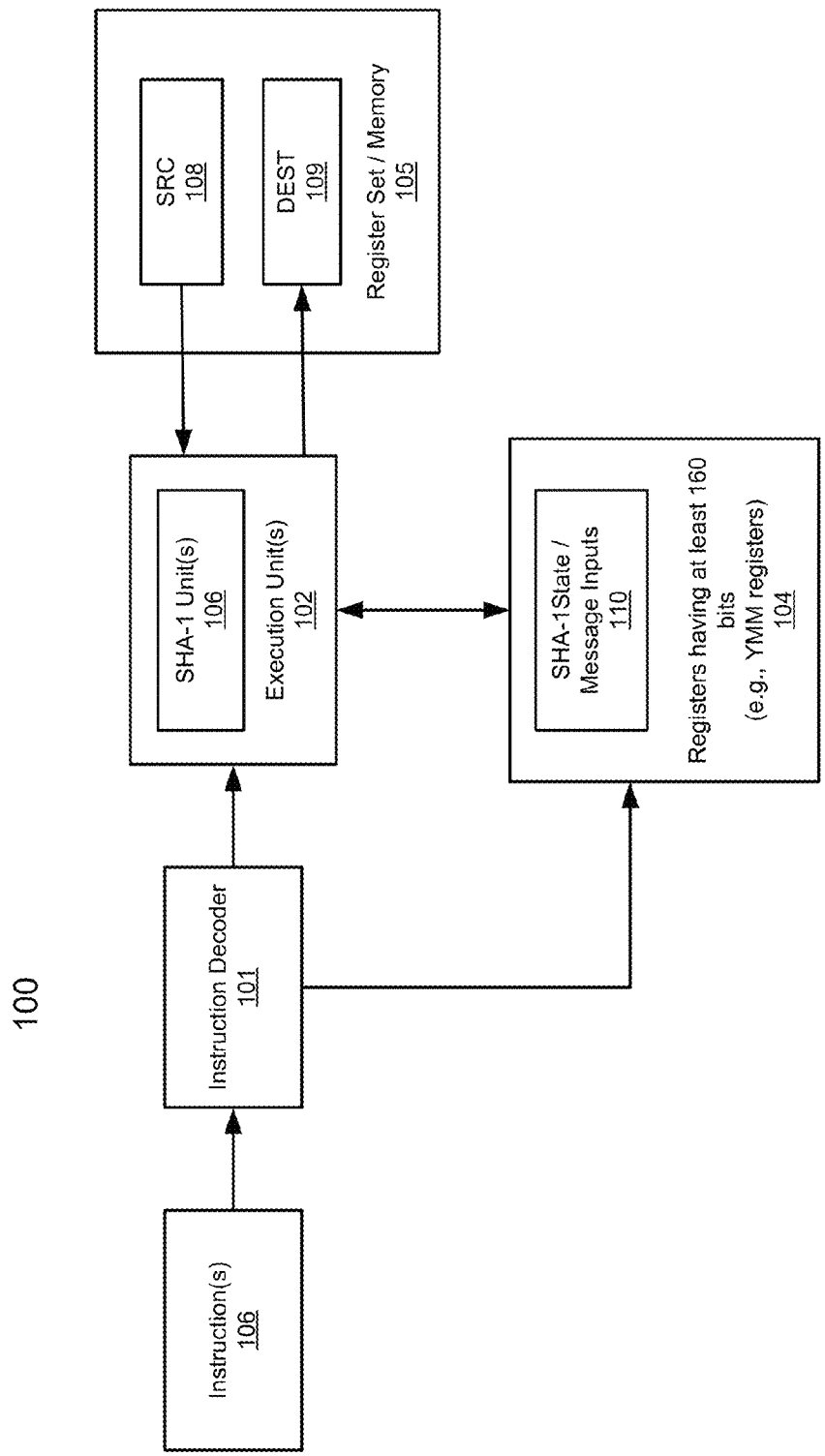
FIG. 3 is a block diagram illustrating an example of a processor according one embodiment.

FIG. 3 is a block diagram illustrating an example of a processor according one embodiment. Referring to FIG. 3, processor 100 may represent any kind of instruction processing apparatuses. For example, processor 101 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. In one embodiment, processor 100 includes instruction decoder 101 to receive and decode instruction 106. Instruction decoder 101 may generate and output one or more micro-operations, micro-code, entry points, microinstructions, other instructions, or other control signals, which reflect, or are derived from, instruction 106. Instruction decoder 101 may be implemented using various different mechanisms. Examples of suitable mechanisms include, but are not limited to, microcode read only memories (ROMs), look-up tables, hardware implementations, programmable logic arrays (PLAs), and the like.

Processor 100 further includes one or more execution units 102, which may include an arithmetic logic unit, or another type of logic unit capable of performing operations based on instruction 106. As a result of instruction decoder 101 decoding instruction 106, execution unit 102 may receive one or more micro-operations, micro-code entry points, microinstructions, other instructions, or other control signals, which reflect, or are derived from, instruction 106. Execution unit 102 may be operable as a result of instruction 106 indicating one or more source operands (SRC) 108 and to store a result in one or more destination operands (DEST) 109 of register set 105 indicated by instruction 106. Execution unit 102 may include circuitry or other execution logic (e.g., software combined with hardware and/or firmware) operable to execute instructions or other control signals derived from instruction 106 and perform an operation accordingly. Execution unit 102 may represent any kinds of execution units such as logic units, arithmetic logic units (ALUs), arithmetic units, integer units, etc.

In one embodiment, instruction 106 may implicitly indicate and/or explicitly specify (e.g., through one or more dedicated fields or sets of bits) the source and destination operands. Examples of suitable sources and/or destination of the operands include registers, memory, immediate of the instruction, and combinations thereof. In various embodiments, the source and destination operands may be 8-bit, 16-bit, 32-bit, or 64-bit operands, although this is not required.

In one embodiment, some or all of the source and destination operands may be stored in registers of a register set and/or memory 105. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

According to one embodiment, execution unit 102 includes one or more SHA-1 units 106 to, in response to a first instruction received and provided by instruction decoder 101, to perform multiple rounds of SHA-1 round operations using data 110 such as SHA-1 states, message inputs, and a hash function specified in one or more registers 104 (e.g., registers having at least 160 bits). The multiple rounds of SHA-1 round operations are performed in response to a single instruction as a single instruction multiple data (SIMD) instruction. In one embodiment, the first instruction includes three operands. The first operand represents a source/destination register to store a current SHA-1 state and a next SHA-1 state as a result of the multiple SHA-1 round operations. The second operand represents a register/memory to store multiple message inputs for the round operations. The third operand represents a hash function such as one of the hash functions as shown in FIG. 2A to be used for the round operations. After the multiple SHA-1 round operations have been performed, the SHA-1 states are updated and stored back to the register specified by the first operand. In one embodiment, at least four rounds of SHA-1 round operations are performed in response to a single SIMD instruction, where the registers involved have at least 160 bits to store the SHA-1 state variables and message inputs.

According to another embodiment, in response to a second instruction, the SHA-1 unit 106 is configured to perform SHA-1 message scheduling operations to produce multiple message inputs for the next cycle (e.g., multiple SHA-1 round operations in a next SIMD instruction cycle). In one embodiment, there may be two instructions needed to prepare the message inputs for the next SIMD cycle. In supporting at least four rounds of SHA-1 round operations, the first instruction includes three operands to store at least 12 previous message inputs and after the first instruction is executed, an intermediate result is generated and return in a register specified in one of the operands. The second instruction takes the intermediate result generated from the first instruction as an input in one operand. Another operand of the second instruction specifies at least 3 previous message inputs. The final result represents 4 message inputs for the next SIMD cycle. In one embodiment, registers involved in the message scheduling operations have at least 128 bits.

For the purpose of illustration, it is assumed four rounds of SHA-1 round operations are performed in a single SIMD cycle. It will be appreciated, more or fewer rounds of SHA-1 round operations can also be performed in a single SIMD cycle, as long as the required resources such as registers with enough bits are available. According to some embodiments, embodiments of the invention include a new instruction and data path that utilizes an YMM SIMD register, which has 256 bits and is compatible with an AVX processor from Intel Corporation of Santa Clara, Calif., as a source/destination operand for the 160 bits of SHA-1 state. Another YMM register or memory location is utilized as a second source operand to store message inputs plus the constant K values for the next four SHA-1 rounds. An immediate operand is used to specify that different combinational logic function "F" required for rounds 1-20, 21-40, 41-60, and 61-80, as shown in FIG. 2A.

According to one embodiment, a SHA-1 round instruction, referred to herein as SHA1RNDS4 (SHA-1 4 rounds), can be defined as follows:

SHA1RNDS4 YMM1, YMM2/m128, immd

Figure 4:
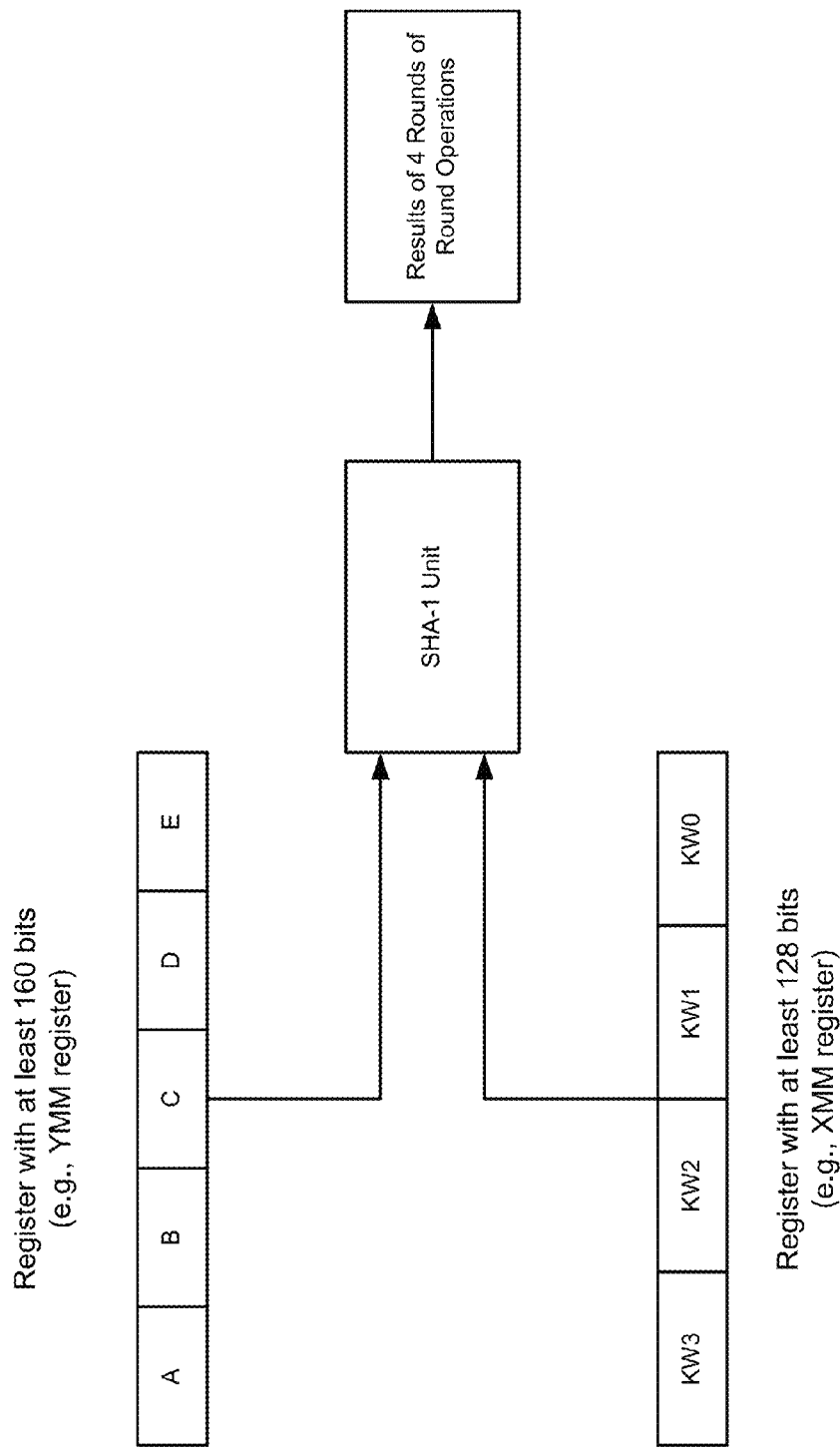
FIG. 4 is a block diagram illustrating a process of performing SHA-1 algorithm according one embodiment.

The SHA1RNDS4 instruction requires 3 cycles to read the SHA-1 state from YMM1 register and Kmessage inputs (e.g., message inputs plus constant K, where K is defined as shown in FIG. 2B) from the YMM2/m128, performs 4 rounds of SHA-1 with the F function specified in the immediate operand "imp," as shown in FIG. 4. With three-cycle latency for four rounds of SHA-1, the throughput rate is about 1 and 1/3 rounds per cycle, or 60 cycles per 512-bit block. The SHA1RNDS4 instruction utilizes a SIMD port once every 3 cycles, providing SIMD instruction slots to add constant K values to the block input data and perform the message scheduling for rounds 17 to 80, including addition of the appropriate K values without slowing down the SHA-1 round operations.

In one embodiment, the SHA1RNDS4 instruction updates the destination YMM1 register with the resulting new state after four rounds of SHA-1 iterations with the F function for all four rounds specified by the immediate operand. YMM2 is a source register with four new message inputs and pre-added round constants, referred to herein as KW0 to KW3. In one embodiment, round 0 input KW0 is in YMM2[31:00]; round 1 input KW1 is in YMM2[63:32]; round 2 input KW2 is in YMM2[95:64]; and round 3 input KW3 is in YMM2[127:96]. In one embodiment, the SHA-1 state variables A, B, C, D, and E can be stored in a YMM register as follows:

A=YMM[255:224]
B=YMM[223:192]
C=YMM[191:160]
D=YMM[159:128]
E=YMM[127:96]

Given the current round of "i" according to one embodiment, the message scheduling function for rounds 17 to 80 can be defined as follows:

w[i]=(w[i−3] XOR w[i−8] XOR w[i−4] XOR w[i−16]) left-rotate 1

A SIMD instruction can be used to calculate four message inputs: w[i+3], w[i+2], w[i+1], and w[i]. For w[32] to w[80] the message inputs can be calculated in five instruction budget provided a SIMD rotate instruction. The calculation of message inputs 16 to 31 may not keep pace with SHA-1 round instruction SHA1RNDS4 even given a SIMD rotate.

According to one embodiment, message scheduling for SHA-1 can be achieved without using all five SIMD instruction slots by implementing the w[i] function using the following two instructions:

MSG1SHA1 XMM0, XMM1, XMM2
MSG2SHA1 XMM0, XMM1

According to one embodiment, an XMM register has at least 128 bits, which may be compatible with an XMM register of an AVX compatible processor from Intel Corporation.

The message scheduling instructions insure optimal performance in processing of the SHA-1 data blocks. Given w[i] as calculated by the SHA1RNDS4 instruction described above, in one embodiment, the MSG1SHA1 causes the processor to perform the following operations:

Word0=w[i−8] XOR w[i−14] XOR w[i−16]
Word1=w[i−7] XOR w[i−13] XOR w[i−15]
Word1=w[i−6] XOR w[i−12] XOR w[i−14]
Word1=w[i−5] XOR w[i−11] XOR w[i−13]

The intermediate result of the MSG1SHA1 instruction is returned via XMM0 register.

According to one embodiment, MSG1SHA1 causes the processor to perform, as a first part of SHA-1 message scheduling operations, an intermediate calculation for the next for SHA-11 message inputs. A SHA-1 schedules message input "w" for rounds 16 to 79 can be defined as:

w(i)=(w(i−3) XOR w(i−8) XOR w(i−14) XOR w(i−16))<<1
msg1=w(i−8) XOR w(i−14) XOR w(i−16)

where operation "<<" represents a logical left-rotate operation.

In one embodiment, XMM2 register is to store messages w(i−13), w(i−14), w(i−15), and w(i−16) as follows:

XMM2[127:96]=w(i−13)
XMM2[95:64]=w(i−14)
XMM2[63:32]=w(i−15)
XMM2[31:00]=w(i−16)

In one embodiment, XMM1 register is to store messages w(i−9), w(i−10), w(i−11), and w(i−12) as follows:

XMM1[127:96]=w(i−9)
XMM1[95:64]=w(i−10)
XMM1[63:32]=w(i−11)
XMM1[31:00]=w(i−12)

In one embodiment, XMM0 register is to store messages w(i−5), w(i−6), w(i−7), and w(i−8) as follows:
XMM0[127:96]=w(i−5)
XMM0[95:64]=w(i−6)
XMM0[63:32]=w(i−7)
XMM0[31:00]=w(i−8)

In one embodiment, the output of instruction MSG1SHA1 is stored in XMM0 as: w(i−5) XOR w(i−11) XOR w(i−13), w(i−6) XOR w(i−12) XOR w(i−14), w(i−7) XOR w(i−13) XOR w(i−15), w(i−8) XOR w(i−14) XOR w(i−16). In a particular embodiment, the result may be stored in the XMM0 register as follows:

XMM0[127:96]=w(i−5) XOR w(i−11) XOR w(i−13); Msg1 for w(i+3)
XMM0[95:64]=w(i−6) XOR w(i−12) XOR w(i−14); Msg1 for w(i+2)
XMM0[63:32]=w(i−7) XOR w(i−13) XOR w(i−15); Msg1 for w(i+1)
XMM0[31:00]=w(i−8) XOR w(i−14) XOR w(i−16); Msg1 for w(i)

Based on the intermediate result generated by the MSG1SHA1 instruction, according to one embodiment, the MSG2SHA1 instruction causes the processor to perform the following operations:

Word0=w[i]=(w[i−3] XOR Word0 of MSG1SHA1) left-rotate 1
Word1=w[i+1]=(w[i−2] XOR Word1 of MSG1SHA1) left-rotate 1
Word2=w[i+2]=(w[i−1] XOR Word2 of MSG1SHA1) left-rotate 1
Word3=w[i+3]=(w[i] XOR Word0 result of this MSG2SHA1) left-rotate 1 where w[i] input for Word3 is the result of Word0. Since Word3 requires the output from Word0, the computation of Word3 may be performed with a delay until the Word0 computation is completed. For example, Word0 and Word1 may be calculated in a first processor cycle and Word2 and Word3 may be calculated in a second processor cycle after the first processor cycle to ensure that Word0 is available when Word3 is being calculated.

According to one embodiment, instruction MSG2SHA1 causes the processor to produce the next four input messages combining the XMM register containing messages w(i−1), w(i−2), w(i−3), and w(i−4), with XMM register with the Msg1 results for w(i−5) to w(i−16). In one embodiment, XMM1 register is to store messages w(i−1), w(i−2), w(i−3), and w(i−4) as follows:
XMM1[127:96]=w(i−1)
XMM1[ 95:64]=w(i−2)
XMM1[ 63:32]=w(i−3)
XMM1[ 31:00]=w(i−4)

In one embodiment, XMM0 register is to store the intermediate result generated by instruction MSG1SHA1 as follows:
XMM0[127:96]=w(i−5) XOR w(i−11) XOR w(i−13); Msg1 for w(i+3)
XMM0[95:64]=w(i−6) XOR w(i−12) XOR w(i−14); Msg1 for w(i+2)
XMM0[63:32]=w(i−7) XOR w(i−13) XOR w(i−15); Msg1 for w(i+1)
XMM0[31:00]=w(i−8) XOR w(i−14) XOR w(i−16); Msg1 for w(i)

In one embodiment, the output of instruction MSG2SHA1 is stored in XMM0 register as follows:
XMM0[127:96]=w(i+3)
XMM0[95:64]=w(i+2)
XMM0[63:32]=w(i+1)
XMM0[31:00]=w(i)

FIGS. 8A and 8B are pseudocode representing a sequence of code received by a processor to perform SHA-1 algorithm according to one embodiment.

Figure 5:
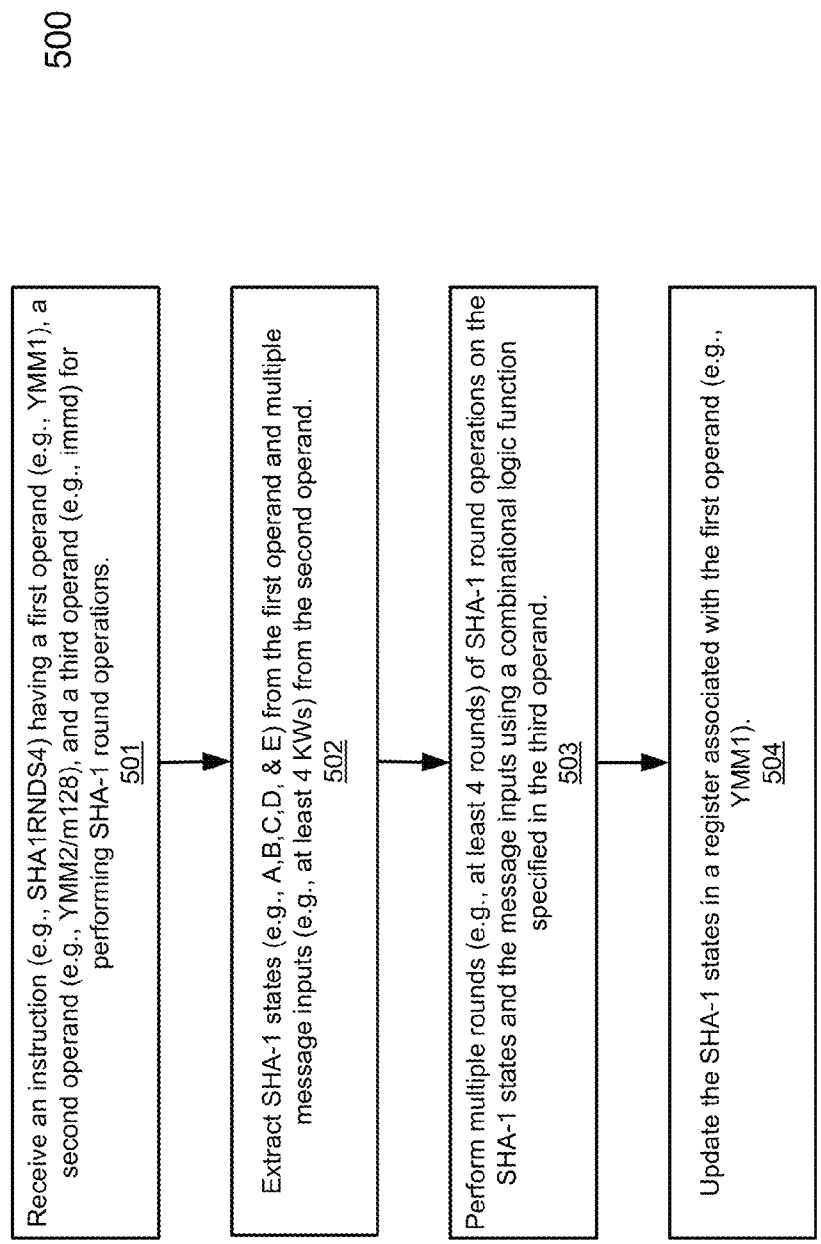
FIG. 5 is a flow diagram illustrating a method to perform a SHA-1 round operation according to one embodiment.

FIG. 5 is a flow diagram illustrating a method to perform a SHA-1 round operation according to one embodiment. For example, method 500 may be performed by SHA-1 unit 106 in response to a SHA1RNDS4 instruction. Referring to FIG. 5, at block 501, a processor receives an instruction such as a SHA1RNDS4 instruction having a first operand (e.g., YMM1), a second operand (e.g., YMM2/m128), and a third operand (e.g., immd). At block 502, in response to the instruction, SHA-1 states (e.g., SHA-1 states A, B, C, D, & E) are extracted from the first operand and multiple message inputs (e.g., KWs) are retrieved from the second operand. At block 503, multiple rounds of SHA-1 round operations are performed on the SHA-1 states and message inputs using a combinational logic function specified in the third operand. At block 504, the SHA-1 states are updated as a result of the multiple rounds of SHA-1 operations.

Figure 6:
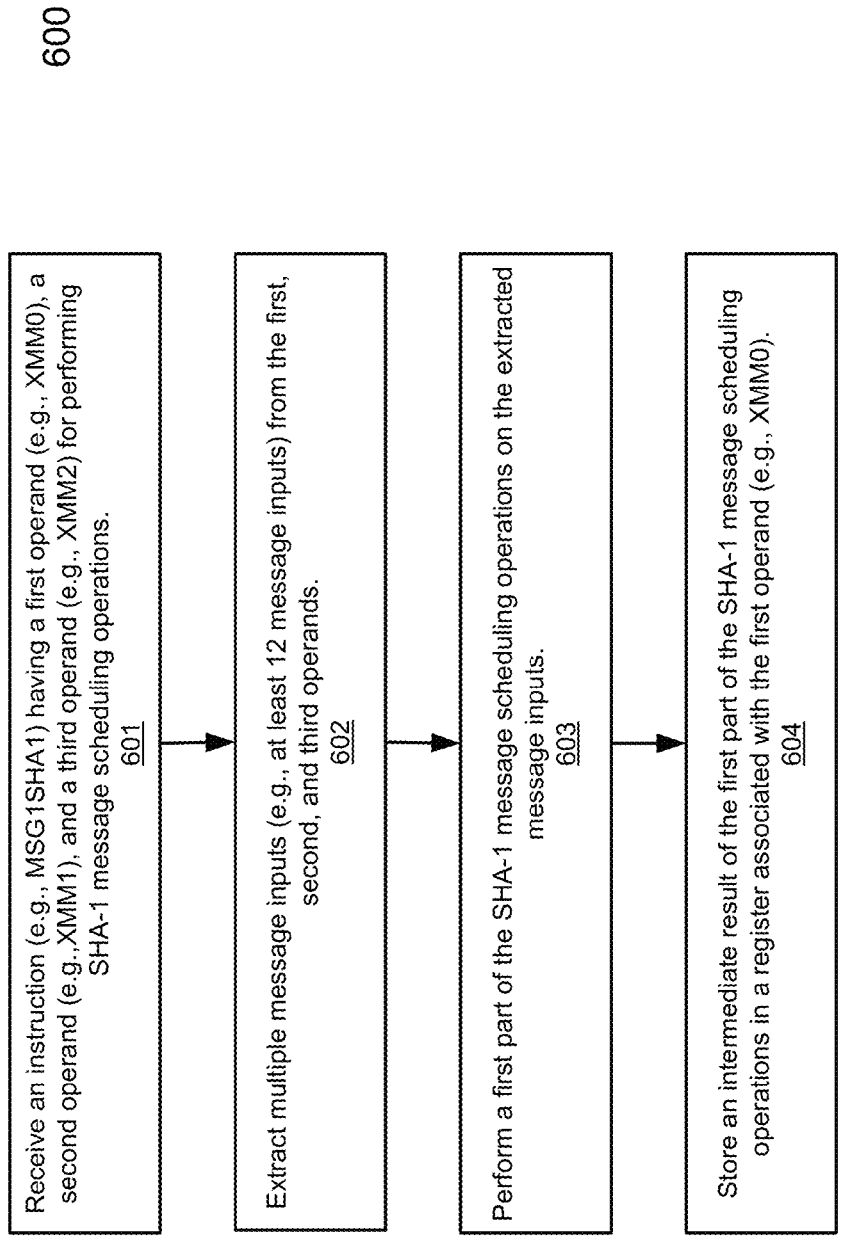
FIG. 6 is a flow diagram illustrating a method to perform SHA-1 message scheduling operations according to one embodiment.

FIG. 6 is a flow diagram illustrating a method to perform SHA-1 message scheduling operations according to one embodiment. For example, method 600 may be performed by SHA-1 unit 106 in response to a MSG1SHA1 instruction. Referring to FIG. 6, at block 601, a processor receives an instruction such as a MSG1SHA1 instruction having a first operand (e.g., XMM0), a second operand (e.g., XMM1), and a third operand (e.g., XMM2). At block 602, in response to the instruction, multiple message inputs are extracted from the first, second, and third operands. At block 603, a first part of the SHA-1 message scheduling operations is performed. At block 604, an intermediate result of the first part of the SHA-1 message scheduling operations is stored in a register associated with the first operand (e.g., XMM0).

Figure 7:
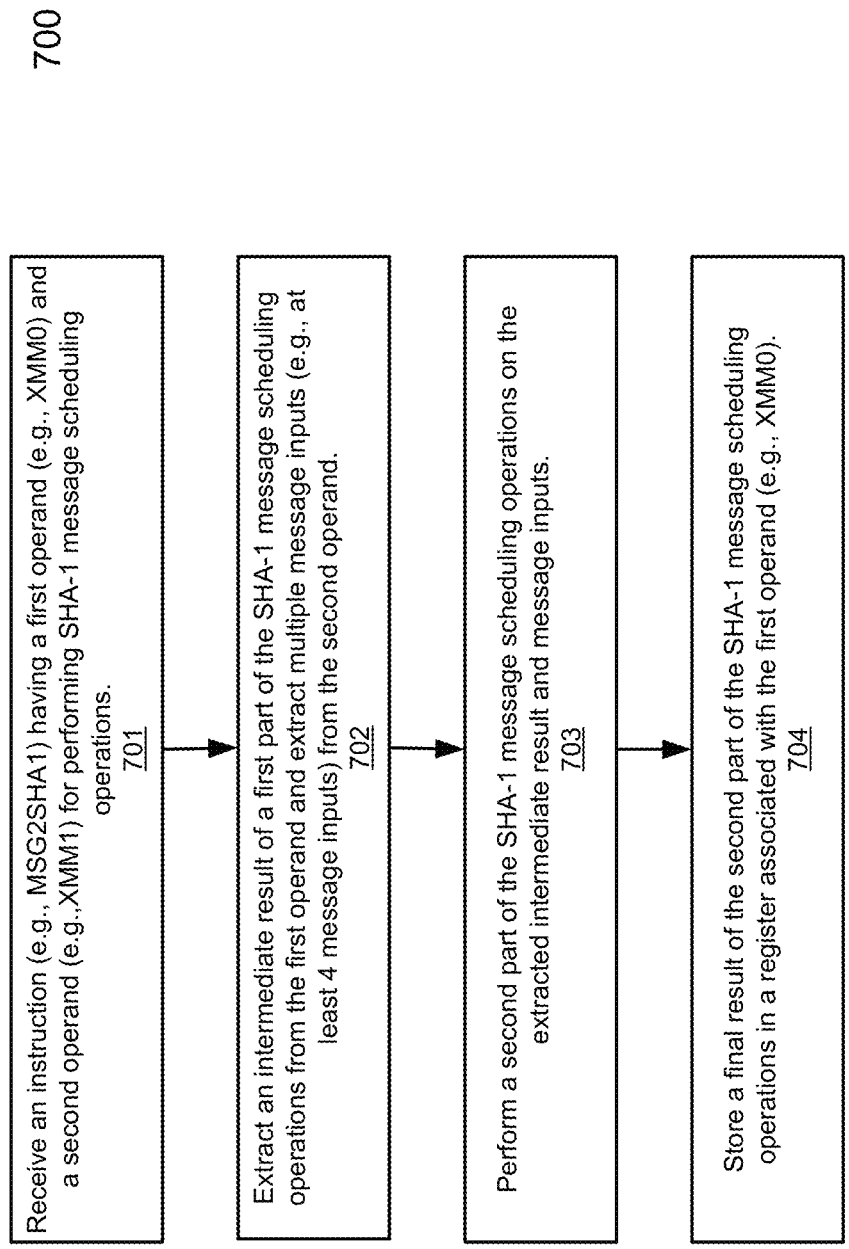
FIG. 7 is a flow diagram illustrating a method to perform SHA-1 message scheduling operations according to another embodiment.

FIG. 7 is a flow diagram illustrating a method to perform SHA-1 message scheduling operations according to another embodiment. For example, method 700 may be performed by SHA-1 unit 106 in response to a MSG2SHA1 instruction. Referring to FIG. 7, at block 701, a processor receives an instruction such as a MSG2SHA1 instruction having a first operand (e.g., XMM0) and a second operand (e.g., XMM1). At block 702, in response to the instruction, an intermediate result is extracted from the first operand and multiple message inputs are extracted from the second operand. The intermediate result represents a first part of the SHA-1 message scheduling operations, for example, in response to a MSG1SHA1 instruction. At block 703, a second part of the SHA-1 message scheduling operations is performed based on the intermediate result and the message inputs. At block 704, a final result of the SHA-1 message scheduling operations is stored in a register associated with the first operand (e.g., XMM0).

Figure 9:
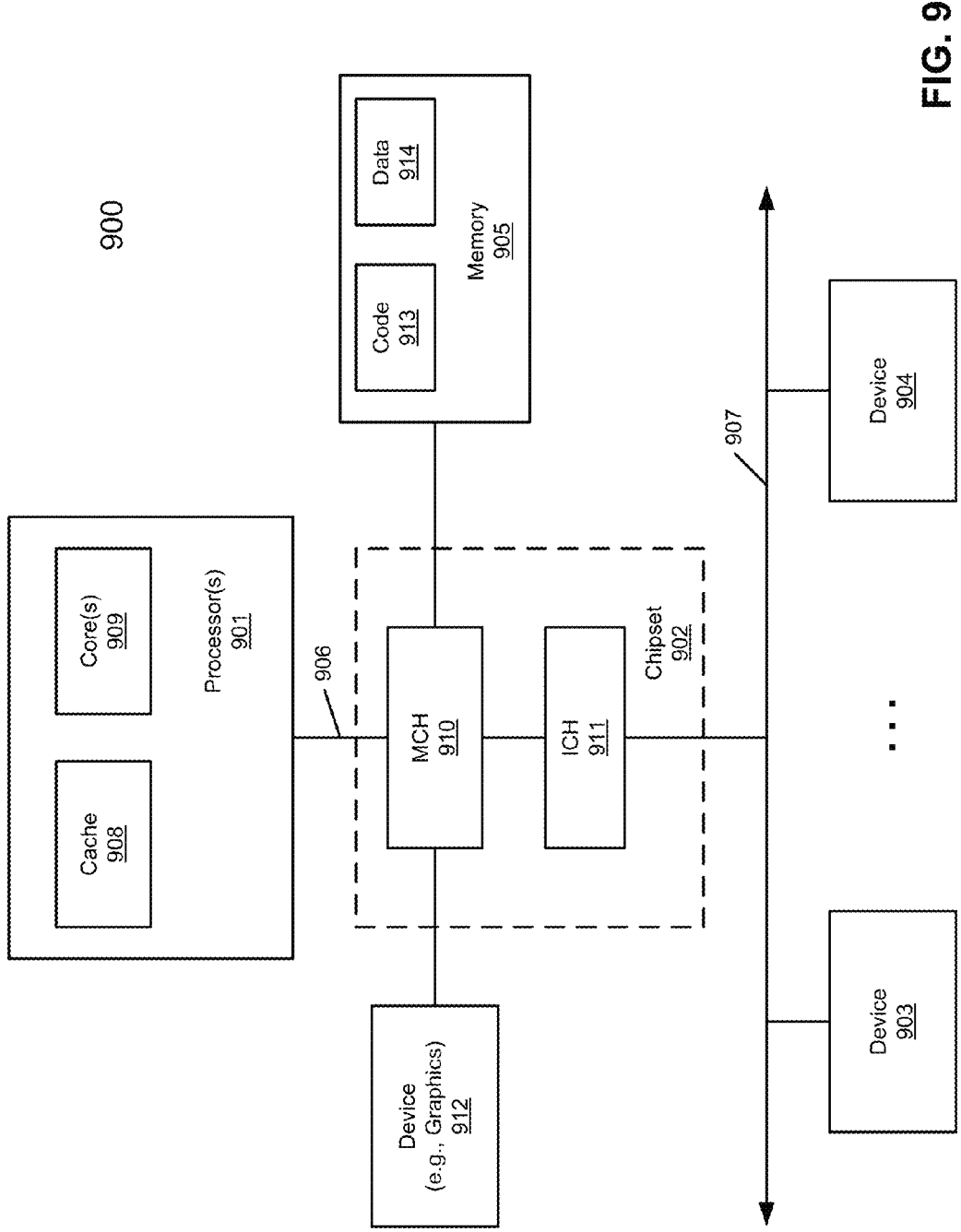
FIG. 9 is a block diagram illustrating an example of a data processing system according to one embodiment.

FIG. 9 is a block diagram illustrating an example of a data processing system according to one embodiment of the invention. System 900 may represent any of the systems described above. For example, processor 901 may represent processor 100 of FIG. 3. System 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 9, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™, Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, micro-code read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 10:
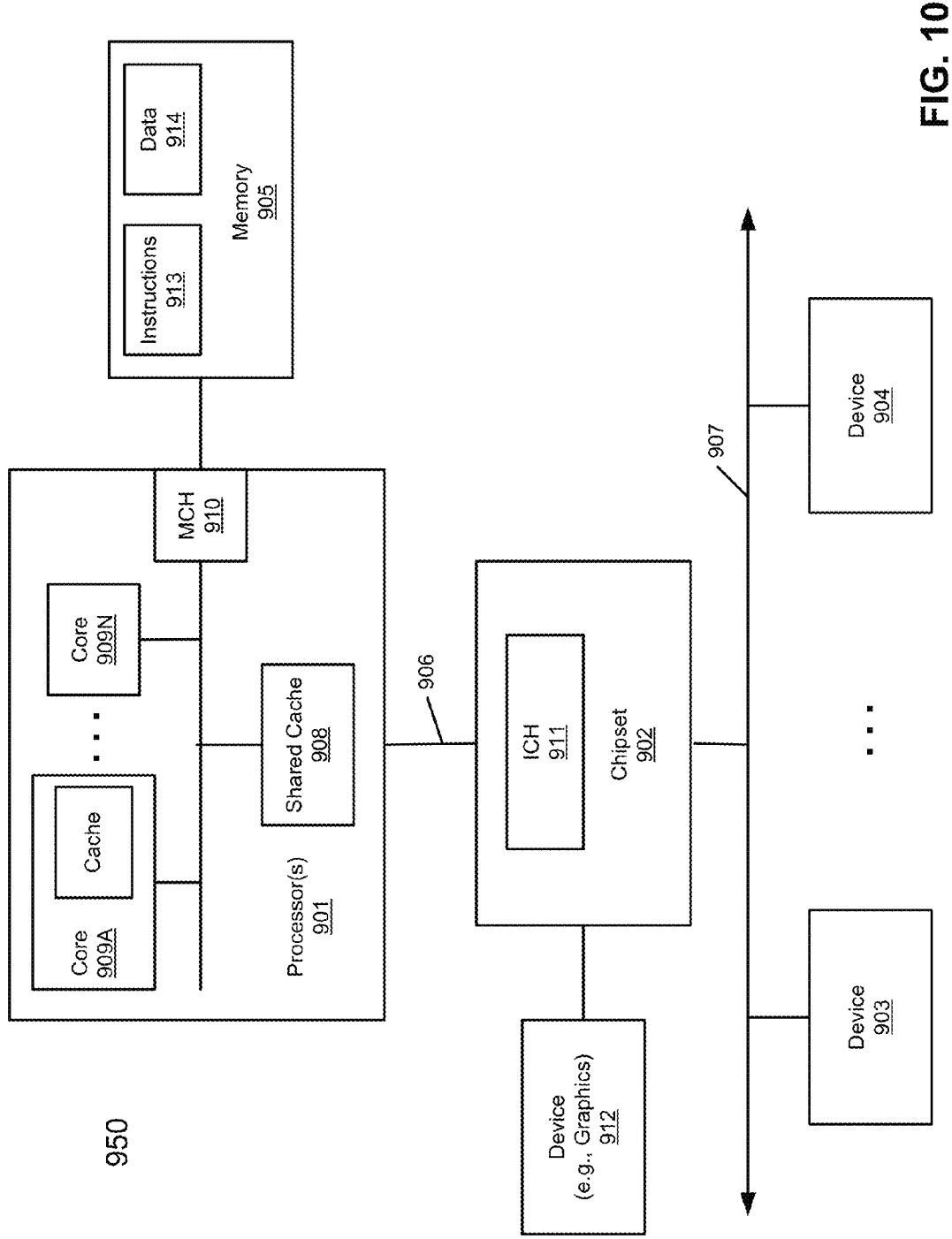
FIG. 10 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 10. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   an instruction decoder to receive a first instruction to process a SHA-1 hash algorithm, the first instruction having a first operand to store a SHA-1 state, a second operand to store a plurality of messages, and a third operand to specify a hash function; and
   an execution unit coupled to the instruction decoder, in response to the first instruction, to perform a plurality of rounds of the SHA-1 hash algorithm on the SHA-1 state specified in the first operand and the plurality of messages specified in the second operand, using the hash function specified in the third operand, wherein the instruction decoder receives a second instruction, and wherein in response to the second instruction, the execution unit performs a first part of message scheduling operations based on a plurality of first previous messages specified by the second instruction.

2. The processor of claim 1, wherein the first operand specifies a first register having at least 160 bits storing data of SHA-1 state variables.

3. The processor of claim 2, wherein the second operand specifies a second register or a memory location having at least 128 bits storing at least four messages.

4. The processor of claim 3, wherein at least four rounds of the SHA-1 algorithm are performed in response to the first instruction as a single instruction multiple data (SIMD) instruction.

5. The processor of claim 1, wherein the instruction decoder receives a third instruction, and wherein in response to the third instruction, the execution unit is configured to perform a second part of the message scheduling operations on second previous messages and the intermediate result specified in the third instruction, generating next input messages for a plurality of round operations of the SHA-1 algorithm to be performed during a next plurality of rounds of SHA-1 algorithm.

6. The processor of claim 5, wherein for a current round i of SHA-1 round operations, the first previous messages comprise messages w(i−5) to w(i−16), wherein the second previous messages comprise messages w(i−1) to w(i−4), and wherein the next input messages comprises w(i), w (i+1), w(i+2), and w(i+3).

7. The processor of claim 5, wherein the intermediate result comprises results of w(i−5)^w(i−11)^w(i−13), w(i−6)^w(i−12)^w(i−14), w(i−7)^w(i−13)^w(i−15), and w(i−8)^w(i−14)^w(i−16).

8. A method, comprising:
receiving, at an instruction decoder of a processor, a first instruction to process a SHA-1 hash algorithm, the first instruction having a first operand to store a SHA-1 state, a second operand to store a plurality of messages, and a third operand to specify a hash function; and
in response to the first instruction, performing, by an execution unit of the processor, a plurality of rounds of the SHA-1 hash algorithm on the SHA-1 state specified in the first operand and the plurality of messages specified in the second operand, using the hash function specified in the third operand, wherein the instruction decoder receives a second instruction, and wherein in response to the second instruction, the execution unit performs a first part of message scheduling operations based on a plurality of first previous messages specified by the second instruction.

9. The method of claim 8, wherein the first operand specifies a first register having at least 160 bits storing data of SHA-1 state variables.

10. The method of claim 9, wherein the second operand specifies a second register or a memory location having at least 128 bits storing at least four messages.

11. The method of claim 10, wherein at least four rounds of the SHA-1 algorithm are performed in a vector manner in response to the first instruction as a single instruction multiple data (SIMD) instruction.

12. The method of claim 8, wherein the instruction decoder receives a third instruction, and wherein in response to the third instruction, the execution unit is configured to perform a second part of the message scheduling operations on second previous messages and the intermediate result specified in the third instruction, generating next input messages for a plurality of round operations of the SHA-1 algorithm to be performed during a next plurality of rounds of SHA-1 algorithm.

13. The method of claim 12, wherein for a current round i of SHA-1 round operations, the first previous messages comprise messages w(i−5) to w(i−16), wherein the second previous messages comprise messages w(i−1) to w(i−4), and wherein the next input messages comprises w(i), w (i+1), w(i+2), and w(i+3).

14. The method of claim 12, wherein the intermediate result comprises results of w(i−5)^w(i−11)^w(i−13), w(i−6)^w(i−12)^w(i−14), w(i−7)^w(i−13)^w(i−15), and w(i−8)^w(i−14)^w(i−16).

15. A data processing system, comprising:
an interconnect;
a processor coupled the interconnect to receive a first instruction to process a SHA-1 hash algorithm, the first instruction having a first operand to store a SHA-1 state, a second operand to store a plurality of messages, and a third operand to specify a hash function, to execute the first instruction to perform a plurality of rounds of the SHA-1 hash algorithm on the SHA-1 state specified in the first operand and the plurality of messages specified in the second operand, using the hash function specified in the third operand, wherein the processor receives a second instruction, and wherein in response to the second instruction, the processor performs a first part of message scheduling operations based on a plurality of first previous messages specified by the second instruction; and
a dynamic random access memory (DRAM) coupled to the interconnect.

16. The system of claim 15, wherein the first operand specifies a first register having at least 160 bits storing data of SHA-1 state variables.

17. The system of claim 16, wherein the second operand specifies a second register or a memory location having at least 128 bits storing at least four messages.

18. The system of claim 17, wherein at least four rounds of the SHA-1 algorithm are performed in a vector manner in response to the first instruction as a single instruction multiple data (SIMD) instruction.

19. The system of claim 15, wherein the processor receives a third instruction, and wherein in response to the third instruction, the processor is configured to perform a second part of the message scheduling operations on second previous messages and the intermediate result specified in the third instruction, generating next input messages for a plurality of round operations of the SHA-1 algorithm to be performed during a next plurality of rounds of SHA-1 algorithm.

20. The system of claim 19, wherein for a current round i of SHA-1 round operations, the first previous messages comprise messages w(i−5) to w(i−16), wherein the second previous messages comprise messages w(i−1) to w(i−4), and wherein the next input messages comprises w(i), w (i+1), w(i+2), and w(i+3).

* * * * *